J. K. STEWART.
COTTON PICKING DEVICE.
APPLICATION FILED JULY 30, 1910.
1,096,325.
Patented May 12, 1914.
2 SHEETS—SHEET 2.
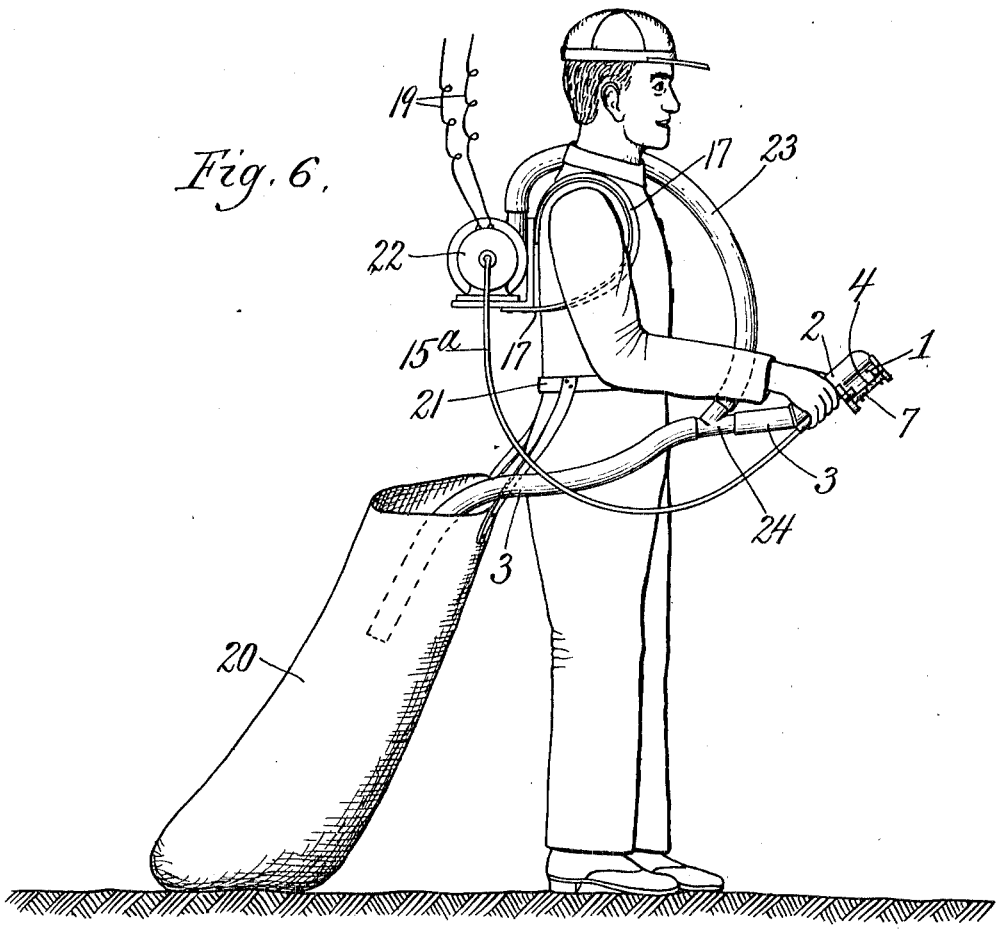
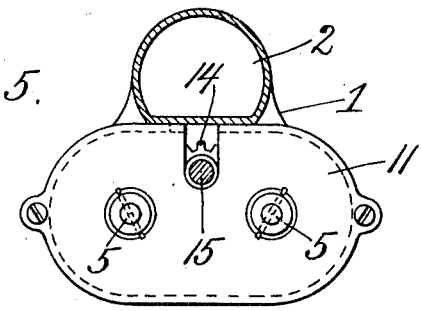
Witnesses.
Edward T. Wray.
Jean Elliott
Inventor.
John K. Stewart,
by Burton & Burton
his Atty's.

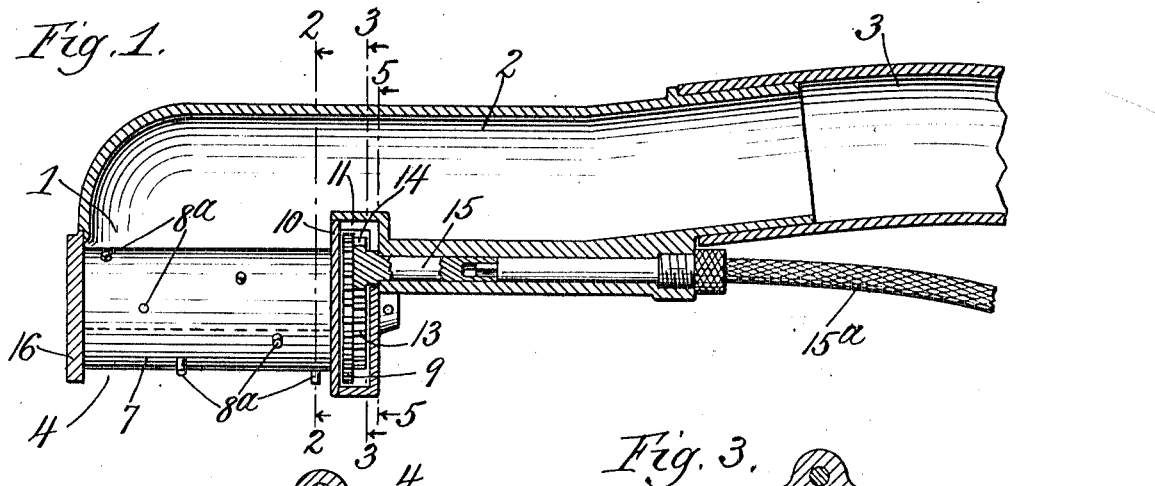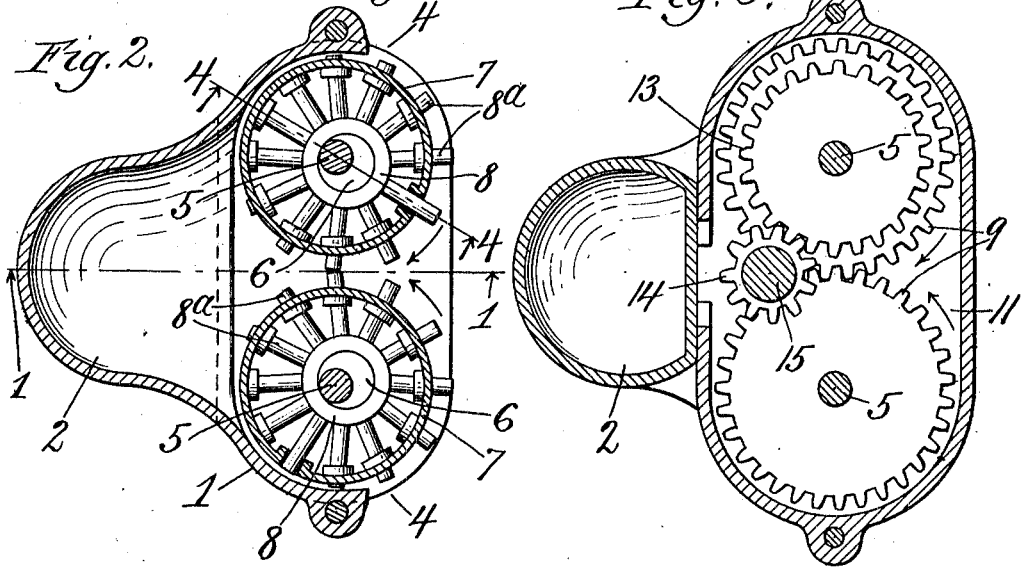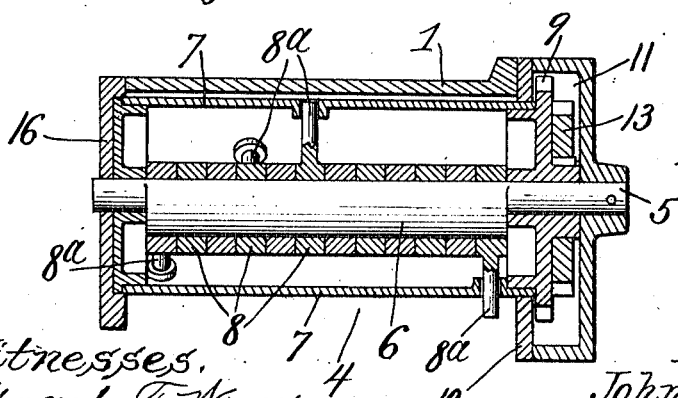

UNITED STATES PATENT OFFICE.

JOHN K. STEWART, OF CHICAGO, ILLINOIS.

COTTON-PICKING DEVICE.

1,096,325.  Specification of Letters Patent.  Patented May 12, 1914.

Application filed July 30, 1910. Serial No. 574,634.

*To all whom it may concern:*

Be it known that I, JOHN K. STEWART, a citizen of the United States, residing at Chicago, in the county of Cook and State of Illinois, have invented new and useful Improvements in Cotton-Picking Devices, of which the following is a specification, reference being had to the accompanying drawings, forming a part thereof.

The purpose of this invention is to provide an improved device for picking cotton, adapted to be manually applied to the cotton boll, though not limited to manual application.

It consists of elements and features of construction shown and described as indicated in the claims.

In the drawings: Figure 1 is a longitudinal vertical section at the line 1—1 on Fig. 2, showing a structure embodying this invention. Fig. 2 is a section at the line 2—2 on Fig. 1. Fig. 3 is a section at the line 3—3 on Fig. 1. Fig. 4 is a section at the line 4—4 on Fig. 2. Fig. 5 is a section at the line 5—5 on Fig. 2. Fig. 6 shows the device mounted in position of use upon the person of the operator.

The hand-carried picking device will first be described. It comprises a housing 1, from which extends a hollow limb 2, constituting a discharge pipe connection and handle, and to which a flexible pipe 3 may be attached, as shown in Fig. 1. This housing has at one side an opening 4, from which the pickers hereinafter described, protrude. 5, 5, are fixed shafts parallel to each other, which are mounted in the housing walls extending across the opening, each having an offset portion or eccentric wrist 6. Upon these shafts there are mounted for rotation about the axes of the shafts two cylindrical hollow rolls or shells 7, 7, which guard the opening, 4, by occupying all but a limited portion of said opening, restricting entrance therethrough into said housing to said limited portion, which is a narrow gap, 7ª, between the proximate sides of said guard rolls. By reason of their function of thus restricting and guarding the opening into the housing, these rolls are hereinafter referred to as guards or guard rolls, and on the off-set eccentric wrists 6 there are journaled,—lying close to each other and in the aggregate occupying the entire length of the eccentric wrists, respectively,—rings or collars 8, each of which has a radially extending finger 8ª, said fingers protruding through the guard rolls 7, 7, which are provided with apertures at proper positions for that purpose. The eccentric wrists 6 of the shafts 5 are offset from the shaft axes respectively outwardly with respect to the opening 4 and toward each other,—that is, in converging planes oblique to the plane containing the axes of the two shafts, and at the side of said plane toward the opening. With this construction, it will be seen that upon rotation of the two cylindrical guards toward each other at the side which is outward with respect to the opening, the fingers 9 will be protruded from the two guards toward each other at their outer and proximate sides, and will be retracted within the guards at their inner and proximate sides at which they are revolving away from each other, and that upon the tool being carried in the hand of the operator, who grasps it at the pipe connection 2 and applies it mouth foremost to a cotton boll, the fiber on the latter will be engaged between the protruding and approaching fingers and pulled in between the guards, 7, 7. In this process, the boll itself is excluded from the housing by the proximity of the guards, 7, 7, of the two pickers, said shells being considerably nearer together than the greatest protrusion of the fingers, 8ª, their distance apart being too small to admit the boll between them. And the boll being stopped by the guards while the fiber continues to be pulled by the fingers and the suction, the fiber is plucked positively from the bolls by the suction and said inward pull of the fingers operating against the attachment of the fiber to the boll. The fiber being thus plucked and carried into the housing between the guards, 7, 7, will be released at the inner side of the guards by the retraction of the fingers within the guard rolls, and will thus be left in the inner end of the pipe connection 2, ready to be drawn or pushed outward therethrough and thence to any receptacle.

For the purpose of rotating the guard rolls 7, 7, as above indicated, they are provided at one end,—preferably the end toward the discharge of the pipe connection 2,—with intermeshing gears 9, which are rigid with the rolls respectively, being located thereon back of a guard plate 10, through which the guard rolls are journaled, and within a gear chamber 11, wherein there is provided on one of the guard rolls, rigid therewith, a second gear 13, which meshes with a pinion 14 on a shaft 15, for which a journal bearing is provided on the inner side of the pipe connection 2, and to whose end remote from the gear changer 11, a flexible shaft 15ª may be connected for rotating the rolls through the medium of the gear train described. At their outer or forward end, the guard rolls 7 are journaled in the head plate 16 of the housing, which, as well as the guard plate 10 and gear chamber 11, are detachable from the remainder of the housing for assembling and disassembling the structure.

Any suitable means may be provided for actuating the gear train to rotate the guard rolls; preferably, there is provided an electric motor 22, which may be carried by the operator, mounted upon his person by means of shoulder straps or harness 17 (see Fig. 1), to whose shaft the flexible shaft 15ª, above mentioned, is connected for extending to the pinion shaft 15, as above described. When the motive power is provided by an electric motor, as described, current for energizing it may be provided through circuit wires, represented conventionally at 19, which, it may be understood, extend to a trolley not shown, running on a power-supplying trolley wire to be stretched over the field along the course to be taken by the operator in reaching the cotton plants. No illustration of such trolley wire or its supports is necessary to an understanding of the invention, and the drawings do not contain any representation of these accessories. In accordance with the common usage, the operator, shown in Fig. 6, is provided with a receptacle for the cotton, consisting of the bag 20, which is attached to a belt 21, worn by the operator, the bag trailing on the ground behind him as he moves over the field, this being the common provision in use in ordinary hand-picking. The lower flexible pipe 3, leading from the hand-picker described, will be extended for discharge into the bag 20, as shown in Fig. 1.

In many situations, no special provision need be made for accelerating the movement of the cotton from the point of its delivery in the housing 1, upon the retraction of the picking fingers, through the tubular handle of the picker and connecting tube 3; but such acceleration will facilitate the operation of the device, and may be provided by means of a fan or blower mounted on the shaft of the motor 22, and carried therewith by the operator, the blower tube 23, being connected with the discharge mouth of the fan, extending at any convenient position over the shoulder, or otherwise around the body of the operator for connection into the pipe 3, as seen at 24, trending outward in the direction of the pipe, so as to blow the cotton toward the bag 20, and thus keep the way clear for the movement of the cotton from the inner side of the guards, the engagement of the incoming cotton by the picker fingers being sufficient to keep the quantity which may occupy the housing and the tube connection 2, and the initial portion of the pipe 3, moving without clogging. But the movement, even at this portion, will be assisted by the suction resulting from the partial vacuum created by the onwardly directed blast of air entering the pipe at 24.

I claim:

1. A cotton-picking device comprising a housing and a discharge conduit therefrom, such housing being open at one side forming an entrance into the housing; a guard device and picking fingers projecting therethrough at each of two opposite sides of such opening, said guard devices having their surfaces which are toward each other converging inwardly toward the opening forming a flaring mouth, each of said guard devices being thereby opposed to the picking fingers projecting from the opposite guard device to enable said fingers to positively engage the fiber, said guard surfaces being separated from each other outside the opening by a distance adapting them to stop the entrance of bolls through said opening, said picking fingers being mounted for rotation about axes located behind the respective guards, and means for rotating them about said axes toward each other at the open side of the housing, and for withdrawing them through the guards into the housing for stripping the fiber from the fingers.

2. A cotton picking device comprising a housing and a discharge conduit therefrom, such housing being open at one side; two cylindrical guards mounted for rotation in the housing at the opening at such short distance from each other at their proximate sides as to adapt them to stop the entrance of bolls between them into the housing; means for revolving the guards toward each other at the side facing outward with respect to the housing; picking fingers protruding from the respective guards at their sides facing outwardly and toward each other, whereby each roll coöperates with the fingers from the opposite roll to enable said fingers to positively engage the fiber, and means for withdrawing the fingers into the guards at the inner side of the latter.

3. A cotton-picking device comprising a housing, a discharge conduit therefrom and means for producing suction through such conduit, such housing being open at one side forming an entrance into the housing; a guard device and picking fingers projecting therethrough at each of two opposite sides of such opening, said guard devices having their surfaces which are toward each other converging inwardly toward the opening forming a flaring mouth, each of said guard devices being thereby opposed to the picking fingers projecting from the opposite guard device to enable said fingers to positively engage the fiber, said guard surfaces being separated from each other outside the opening by a distance adapting them to stop the entrance of bolls through said opening, said picking fingers being mounted for rotation about axes located behind the respective guards, and means for rotating them about said axes toward each other at the open side of the housing, and for withdrawing them through the guards into the housing for stripping the fiber from the fingers.

4. A cotton picking device comprising a housing and a discharge conduit therefrom, such housing being open at one side forming a mouth piece; a pair of cylindrical guards mounted in the housing at the opening at such short distance from each other at their proximate sides as to adapt them to stop the entrance of bolls between them into the housing; picking fingers protruding from said guard members at the outwardly facing and at the proximate portions of their surfaces, and mounted for rotation about axes respectively within the same, and means for revolving said fingers of the two guards respectively toward the opposite guards at the opening side of the housing, said guards being adapted by their proximity to the protruded fingers to enable said fingers to positively engage the fiber and said fingers being adapted for withdrawal into the cylindrical guards within said housing for stripping the fiber from them.

5. A cotton picking device comprising a housing and a discharge conduit therefrom, such housing being open at one side, forming a mouth-piece; cylindrical guards mounted in the housing at the opening separated from each other at their proximate sides by a distance adapted to stop the entrance of bolls into the housing; means for revolving the guards toward each other at the side facing outward with respect to the housing; picking fingers protruding from the guards at said outwardly-facing and proximate sides and to within such distance from the respectively opposite guards as to be enabled thereby to penetrate the mass of fiber on the boll for positively engaging said fiber, and so distributed circumferentially and longitudinally on said guards that the fingers of the two guards are not opposed to each other at the proximate sides of the guards, and means for stripping the fiber from the fingers at the inner side of the guards.

6. A cotton picking device comprising a housing and a discharge conduit therefrom, such housing being open at one side, forming an entrance; guards and picking fingers protruding through the guards, respectively, said guards being mounted in the housing at said entrance, and comprising respectively converging surfaces toward which the opposite picking fingers protrude into such proximity therewith as to be enabled by said opposite surfaces to penetrate the mass of fiber on the boll to positively engage the fiber, such converging surfaces being separated from each other by a distance adapting them to stop the entrance of bolls between them into the housing; the picking fingers, associated with the respective guards being mounted for rotation about axes back of said guards, respectively, and means for rotating the fingers of the respective guards toward each other at the open side of the housing, said fingers being distributed circumferentially and longitudinally with respect to their axes of rotation to avoid the encounter of the fingers of one set with those of the other set in their rotation, and to withdraw through the respective guards within the housing for stripping the fiber from the fingers.

In testimony whereof, I have hereunto set my hand, at Chicago, Illinois, this 25th day of July, 1910.

JOHN K. STEWART.

Witnesses:
MINNIE M. LINDENAU,
JEAN ELLIOTT.